(12) United States Patent
Fei et al.

(10) Patent No.: US 10,385,187 B2
(45) Date of Patent: Aug. 20, 2019

(54) BLUE-LIGHT-PROOF OPTICAL RESIN LENS AND PREPARATION METHOD THEREOF

(71) Applicants: JIANGSU CONANT OPTICS CO., LTD, Jiangsu province (CN); Shanghai Conant Optics Co., Ltd., Shanghai (CN)

(72) Inventors: Zhengxiang Fei, Jiangsu province (CN); Qingbo Yan, Jiangsu province (CN); Jianyou He, Jiangsu province (CN); Tianniao Huang, Jiangsu province (CN); Genting Cao, Jiangsu province (CN)

(73) Assignees: JIANGSU CONANT OPTICS CO., LTD, Jiangsu (CN); Shanghai Conant Optics Co., Ltd., Shanghai (CN)

( * ) Notice: Subject to any disclaimer, the term of this patent is extended or adjusted under 35 U.S.C. 154(b) by 17 days.

(21) Appl. No.: 15/516,897

(22) PCT Filed: Jan. 26, 2016

(86) PCT No.: PCT/CN2016/072191
§ 371 (c)(1),
(2) Date: Apr. 5, 2017

(87) PCT Pub. No.: WO2017/113459
PCT Pub. Date: Jul. 6, 2017

(65) Prior Publication Data
US 2018/0044505 A1    Feb. 15, 2018

(30) Foreign Application Priority Data
Dec. 31, 2015 (CN) .......................... 2015 1 1013098

(51) Int. Cl.
| | | |
|---|---|---|
| *C08K 5/109* | (2006.01) | |
| *C08K 5/132* | (2006.01) | |
| *C08K 5/14* | (2006.01) | |
| *G02C 7/02* | (2006.01) | |
| *C08F 18/24* | (2006.01) | |
| *G02B 1/04* | (2006.01) | |
| *G02C 7/10* | (2006.01) | |

(52) U.S. Cl.
CPC .............. *C08K 5/132* (2013.01); *C08F 18/24* (2013.01); *C08K 5/109* (2013.01); *C08K 5/14* (2013.01); *G02B 1/04* (2013.01); *G02B 1/041* (2013.01); *G02C 7/02* (2013.01); *G02C 7/104* (2013.01)

(58) Field of Classification Search
CPC ............ G02B 1/04; C08F 18/24; C08K 5/109
USPC ........................................................ 524/335
See application file for complete search history.

(56) References Cited

FOREIGN PATENT DOCUMENTS

CN    1879041    * 12/2006

* cited by examiner

*Primary Examiner* — Deve E Valdez
(74) *Attorney, Agent, or Firm* — JCIPRNET

(57) ABSTRACT

The present invention disclose a blue-light-proof optical resin lens, comprising resin monomers, a blue light absorber and a polymerization initiator; the mass ratio of the resin monomers to the blue light absorber to the polymerization initiator is 100:0.01-2.00:1.00-4.00; the resin monomers are the mixture of allyl diglycol carbonate (ADC) and polymers thereof; the blue light absorber is a benzophenone type ultraviolet light absorber and/or indole type blue light absorber; the polymerization initiator is selected from one or two of tert-butyl peroxy-2-ethylhexyl carbonate, tert-amyl peroxy-2-ethylhexyl carbonate and 1,1-di-(tert-butylperoxy)-3,3,5-trimethylcyclohexane. A preparation method includes the following steps: weighing the resin monomers, the blue light absorber and the polymerization initiator by ratio, sealing the mixture at room temperature, uniformly stirring the mixture at vacuum, filtering the stirred mixture with a filter core, and then vacuuming; (2) immediate pouring, molding by thermocuring; (3) mold opening, washing the obtained product; (4) annealing the obtained product, and inspecting the product. The blue-light-proof optical resin lens prepared by the method has a blue light absorbency (380-500 nm) of 15%-40%.

9 Claims, No Drawings

BLUE-LIGHT-PROOF OPTICAL RESIN LENS AND PREPARATION METHOD THEREOF

CROSS-REFERENCE TO RELATED APPLICATION

This application is a 371 application of an International PCT application serial no. PCT/CN2016/072191, filed on Jan. 26, 2016, which claims the priority benefits of China Application No. 201511013098.5, filed on Dec. 31, 2015. The entirety of each of the above-mentioned patent applications is hereby incorporated by reference herein and made a part of this specification.

BACKGROUND OF THE INVENTION

Technical Field

The present invention relates to a resin lens, in particular to a blue-light-proof optical resin lens and a preparation method thereof.

2. Description of Related Art

Blue light is a high-energy light with a wavelength of 380-500 nm, has a very strong penetrating power, and easily penetrates the retina and reaches the macular region to wither the sensory receptor cells without regeneration. Electronic products used by people every day, such as computers, smart phones, tablets, LED TV displays, emit a great amount of blue light. As the electric products spread and seep into all aspects of life, the probability that people make contact with blue light increase rapidly, which may cause visual injuries and maculopathy.

The conventional process of the 1.499 resin lens adopts allyl diglycol carbonate (ADC) and isopropyl peroxydicarbonate (IPP). If blue light prevention is required, a blue light absorber is needed. Common blue light absorber includes benzotriazole ultraviolet light absorber, benzophenone ultraviolet light absorber, fluorescent yellow dye, etc. The allyl diglycol carbonate has a high chain opening activation energy, so an initiator with a strong oxidizing property is needed. However, the above mentioned common blue light absorbers are easily oxidized and lose the characteristic of absorbing the blue light through the effect of the strong oxidant. Therefore, a blue-light-proof optical resin lens with a refractive index of 1.490-1.510 is rarely seen on the market, currently.

BRIEF SUMMARY OF THE INVENTION

Thus, in order to solve the above problems, the present invention provides a blue-light-proof optical resin lens and also provides a preparation method for the blue-light-proof optical resin lens. The prepared blue-light-proof optical resin lens has a blue light absorbency (380-500 nm) of 15%-40%.

The present invention adopts the following technical solution. A blue-light-proof optical resin lens includes resin monomers, a blue light absorber and a polymerization initiator; the mass ratio of the resin monomers to the blue light absorber to the polymerization initiator is 100:0.01-2.00:1.00-4.00; the resin monomers are the mixture of allyl diglycol carbonate (ADC) and polymers thereof; the blue light absorber is a benzophenone ultraviolet light absorber and/or an indole blue light absorber; the polymerization initiator is selected from one or two of tert-butyl peroxy-2-ethylhexyl carbonate, tert-amyl peroxy-2-ethylhexyl carbonate and 1,1-di-(tert-butylperoxy)-3,3,5-trimethylcyclohexane.

Optimally, the benzophenone ultraviolet light absorber is selected from one of 2-hydroxy-4-methoxybenzophenone (UV-9), 2-hydroxy-4-octyloxybenzophenone (UV-531), 2,2'-dihydroxy-4,4'-dimethoxybenzophenone (BP-6), 2,2',4,4'-tetrahydroxybenzophenone (BP-2) and 2,2'-hydroxy-4-methoxybenzophenone (UV-24); the indole blue light absorber is 2-cyano-3-(1-methyl-2-phenyl methyl acrylate) indole; and the mass ratio of the benzophenone ultraviolet light absorber to the indole blue light absorber is 0-50:0-10.

Optimally, the blue-light-proof optical resin lens also comprises a blue brightener with a mass ratio of 800-5,000 ppm, for adjusting the lens color and avoiding the lens from yellowing.

A preparation method for the blue-light-proof optical resin lens includes the following steps: (1) preparing materials: weighing the resin monomers and the blue light absorber by ratio, mixing the weighed materials uniformly, heating the mixed materials, adding the polymerization initiator after the blue light absorber is completely dissolved, sealing the mixture at room temperature, uniformly stirring the mixture at vacuum, filtering the stirred mixture with a filter core, and then vacuuming; (2) immediate pouring, molding by thermocuring: pouring the materials prepared in step (1) into a closed mold, and thermocuring to mold the materials; (3) opening the mold, washing the obtained product; (4) annealing the product, and inspecting the obtained product.

The specific process of the material preparation in step (1) comprises the steps of weighing the resin monomers and the blue light absorber by ratio, mixing the weighed materials uniformly, heating the mixed materials to 60° C., adding the polymerization initiator after the blue light absorber is completely dissolved, stirring the mixture for 2 h at room temperature and at a vacuum degree of −0.1 MPa, filtering the mixture with a 0.1 μm filter core, continuously stirring the mixture for 10 min, and then vacuuming for 40 min at a vacuum degree of −0.1 MPa.

Optimally, in step (1), the polymerization initiator is added after the blue light absorber is completely dissolved, and followed by the blue brightener with a mass ratio of 800-5,000 ppm.

Optimally, the thermocuring temperature curve and curing time in step (2) are as follows: heat up for 3 h such that the temperature rises from the range of 30-35° C. to the range of 80-95° C., keep the temperature in the range of 80-95° C. for 10 h, then continuously heat up for 711 such that the temperature rises from the range of 85-95° C. to the range of 95-110° C., keep the temperature in the range of 95-110° C. for 111, continuously heat up for 111 such that the temperature rises from the range of 95-110° C. to the range of 110-120° C., keep the temperature in the range of 110-120° C. for 1 h, and then cool down for 1 h such that the temperature reaches the range of 60-75° C.

In step (4), the annealing temperature is 120° C. and the annealing time is 1 h.

The present invention has the following beneficial effects: the use of the mixture of the allyl diglycol carbonate and the polymers thereof as the resin monomers reduces the chain opening activation energy, so a polymerization initiator with a relatively low oxidizing property can perform the initialization, has an oxidizing property far lower than that of IPP, and does not damage the blue light absorbing characteristic of the benzophenone ultraviolet light absorber and the indole blue light absorber. The blue-light-proof optical resin lens prepared by the method has a blue light absorbency (380-500 nm) of 15%-40%.

DETAILED DESCRIPTION OF THE INVENTION

To deepen the understanding of the present invention, the present invention is further described below in conjunction with embodiments. The embodiments are used for the purpose of explaining the present invention only, and do not define the protective scope of the present invention.

Embodiment 1

The mixture of the allyl diglycol carbonate and the polymers thereof (product code: RAV 7NG) produced by ACOMN are selected as the resin monomers; 2-hydroxy-4-methoxybenzophenone (UV-9) is selected as the benzophenone ultraviolet light absorber; and test-butyl peroxy-2-ethylhexyl carbonate is selected as the polymerization initiator. 20 kg of RAV-7NG monomers and 300 g of 2-hydroxy-4-methoxybenzophenone (UV-9) are weighed, mixed uniformly and heated to 60° C. After the blue light absorber is completely dissolved, 200 g of the initiator and 50 g of the blue brightener are added. The mixed materials are sealed at room temperature and stirred uniformly at vacuum. The mixed materials are stirred for 2 h at room temperature and at a vacuum degree of −0.1 MPa, and after being filtered with a 0.1 µm filter core, continuously stirred for 10 min. At a vacuum degree of −0.1 MPa, vacuuming proceeds for 40 min. Then, the materials are immediately poured. The prepared materials are poured into a closed mold and thermocured to be molded. The curing curve is as follows: heat up for 3 h such that the temperature rises from 30° C. to 80° C., keep the temperature at 80° C. for 10 h, continuously heat up for 7 h such that the temperature rises from 85° C. to 110° C., keep the temperature at 110° C. for 1 h, continuously heat up for 1 h such that the temperature rises from 110° C. to 120° C., keep the temperature at 120° C. for 1 h, and then cool down for 1 h such that the temperature reaches 60° C. Then, the mold is opened and the molded lens is washed. The lens is annealed for 1 h at a temperature of 120° C. After passing the inspection, the lens is sent to the warehouse. The blue light absorbency (380-500 nm) is 26.9%.

Embodiment 2

The mixture of the allyl diglycol carbonate and the polymers thereof (product code: RAV 7NG) produced by ACOMN are selected as the resin monomers; 2,2'-dihydroxy-4,4'-dimethoxybenzophenone (BP-6) is selected as the benzophenone ultraviolet light absorber; and 1,1-di-(tert-butylperoxy)-3,3,5-trimethylcyclohexane is selected as the initiator. 20 kg of RAV-7NG monomers, 10 g of 2-cyano-3-(1-methyl-2-phenyl methyl acrylate) indole and 220 g of 2,2'-dihydroxy-4,4'-dimethoxybenzophenone (BP-6) are weighed, mixed uniformly and heated to 60° C. After the blue light absorber is completely dissolved, 600 g of the initiator and 60 g of the blue brightener are added. The mixed materials are sealed at room temperature and stirred uniformly at vacuum. The mixed materials are stirred for 2 h at room temperature and at a vacuum degree of −0.1 MPa, and after being filtered with a 0.1 µm filter core, continuously stirred for 10 min. At a vacuum degree of −0.1 MPa, vacuuming proceeds for 40 min. Then, the materials are immediately poured. The prepared materials are poured into a closed mold and thermocured to be molded. The curing curve is as follows: heat up for 3 h such that the temperature rises from 35° C. to 85° C., keep the temperature at 85° C. for 10 h, continuously heat up for 7 h such that the temperature rises from 85° C. to 105° C., keep the temperature at 105° C. for 1 h, continuously heat up for 1 h such that the temperature rises from 105° C. to 115° C., keep the temperature at 115° C. for 1 h, and cool down for 1 h such that the temperature reaches 70° C. Then, the mold is opened and the molded lens is washed. The lens is annealed for 1 h at a temperature of 120° C. After passing the inspection, the lens is sent to the warehouse. The blue light absorbency (380-500 nm) is 28.1%.

Embodiment 3

The mixture of the allyl diglycol carbonate and the polymers thereof (product code: LS) produced by PPG are selected as the resin monomers; 2,2'-dihydroxy-4,4'-dimethoxybenzophenone (BP-6) is selected as the benzophenone ultraviolet light absorber; and tert-amyl peroxy-2-ethylhexyl carbonate is selected as the initiator. 20 kg of LS monomers, 16 g of 2-cyano-3-(1-methyl-2-phenyl methyl acrylate) indole and 100 g of 2,2'-dihydroxy-4,4'-dimethoxybenzophenone (BP-6) are weighed, mixed uniformly and heated to 60° C. After the blue light absorber is completely dissolved, 800 g of the initiator and 90 g of the blue brightener are added. The mixed materials are sealed at room temperature and stirred uniformly at vacuum. The mixed materials are stirred for 2 h at room temperature and at a vacuum degree of −0.1 MPa, and after being filtered with a 0.1 µm filter core, continuously stirred for 10 min. At a vacuum degree of −0.1 MPa, vacuuming proceeds for 40 min. Then, the materials are immediately poured. The prepared materials are poured into a closed mold and thermocured to be molded. The curing curve is as follows: heat up for 3 h such that the temperature rises from 32° C. to 95° C., keep the temperature at 95° C. for 10 h, continuously heat up for 7 h such that the temperature rises from 95° C. to 110° C., keep the temperature at 110° C. for 1 h, continuously heat up for 1 h such that the temperature rises from 110° C. to 120° C., keep the temperature at 120° C. for 1 h, and cool down for 1 h such that the temperature reaches 75° C. Then, the mold is opened and the molded lens is washed. The lens is annealed for 1 h at a temperature of 120° C. After passing the inspection, the lens is sent to the warehouse. The blue light absorbency (380-500 nm) is 26.4%.

Embodiment 4

The mixture of the allyl diglycol carbonate and the polymers thereof (product code: LS) produced by PPG are selected as the resin monomers, and 1,1-di-(tert-butylperoxy)-3,3,5-trimethylcyclohexane is selected as the initiator. 20 kg of LS monomers and 2 g of 2-cyano-3-(1-methyl-2-phenyl methyl acrylate) indole are weighed, mixed uniformly and heated to 60° C. After the blue light absorber is completely dissolved, 800 g of the initiator and 100 g of the blue brightener are added. The mixed materials are sealed at room temperature and stirred uniformly at vacuum. The mixed materials are stirred for 2 h at room temperature and at a vacuum degree of −0.1 MPa, and after being filtered with a 0.1 µm filter core, continuously stirred for 10 min. At a vacuum degree of −0.1 MPa, vacuuming proceeds for 40 min. Then, the materials are immediately poured. The prepared materials are poured into a closed mold and thermocured to be molded. The curing curve is as follows: heat up for 3 h such that the temperature rises from 32° C. to 95° C., keep the temperature at 95° C. for 10 h, cool down such that the temperature reduces from 95° C. to 90° C., heat up for 7 h such that the temperature rises from 90° C. to 95° C., keep the temperature at 95° C. for 1 h, heat up for 1 h such that the temperature rises from 95° C. to 110° C., keep the temperature at 110° C. for 1 h, and cool down for 1 h such that the temperature reaches 75° C. Then, the mold is opened and the molded lens is washed. The lens is annealed for 1 h at a temperature of 120° C. After passing the inspection, the lens is sent to the warehouse. The blue light absorbency (380-500 nm) is 22.6%.

Embodiment 5

The mixture of the allyl diglycol carbonate and the polymers thereof (product code: RAV 7NG) produced by ACOMN are selected as the resin monomers; 2-hydroxy-4-octyloxybenzophenone (UV-531) is selected as the benzophenone ultraviolet light absorber; and tert-amyl peroxy-2-ethylhexyl carbonate is selected as the initiator. 20 kg of RAV-7MC monomers and 400 g of 2-hydroxy-4-octyloxy-benzophenone (UV-531) are weighed, mixed uniformly and heated to 60° C. After the blue light absorber is completely dissolved, 480 g of the initiator and 75 g of the blue brightener are added. The mixed materials are sealed at room temperature and stirred uniformly at vacuum. The mixed materials are stirred for 2 h at room temperature and at a vacuum degree of −0.1 MPa, and after being filtered with a 0.1 μm filter core, continuously stirred for 10 min. At a vacuum degree of −0.1 MPa, vacuuming proceeds for 40 min. Then, the materials are immediately poured. The prepared materials are poured into a closed mold and thermocured to be molded. The curing curve is as follows: heat up for 3 h such that the temperature rises from 35° C. to 85° C., keep the temperature at 85° C. for 10 h, continuously heat up for 7 h such that the temperature rises from 85° C. to 95° C., heat up for 1 h such that the temperature rises from 95° C. to 105° C., continuously heat up for 1 h such that the temperature rises from 105° C. to 110° C., continuously heat up for 1 h such that the temperature rises from 110° C. to 120° C., and cool down for 1 h such that the temperature reaches 70° C. Then, the mold is opened and the molded lens is washed. The lens is annealed for 1 h at a temperature of 120° C. After passing the inspection, the lens is sent to the warehouse. The blue light absorbency (380-500 nm) is 28.4%.

The above description only involves some of the preferred embodiments and does not limit the present invention in any form. Any modifications or changes made upon the technical principle of the present invention shall fall within the protective scope of the present invention.

What is claimed is:

1. A blue-light-proof optical resin lens, comprising resin monomers, a blue light absorber and a polymerization initiator; the mass ratio of the resin monomers to the blue light absorber to the polymerization initiator is 100:0.01-2.00:1.00-4.00; the resin monomers are the mixture of allyl diglycol carbonate (ADC) and polymers thereof; the blue light absorber is a benzophenone ultraviolet light absorber and an indole blue light absorber; the polymerization initiator is selected from one or two of tert-butyl peroxy-2-ethylhexyl carbonate, tert-amyl peroxy-2-ethylhexyl carbonate and 1,1-di-(tert-butylperoxy)-3,3,5-trimethylcyclohexane.

2. The blue-light-proof optical resin lens according to claim 1, wherein the benzophenone ultraviolet light absorber is selected from one of 2-hydroxy-4-methoxybenzophenone, 2-hydroxy-4-octyloxybenzophenone, 2,2'-dihydroxy-4,4'-dimethoxybenzophenone, 2,2',4,4'-tetrahydroxybenzophenone and 2,2'-hydroxy-4-methoxybenzophenone; the indole blue light absorber is 2-cyano-3-(1-methyl-2-phenyl methyl acrylate) indole; and the mass ratio of the benzophenone ultraviolet light absorber to the indole blue light absorber is 0-50:0-10.

3. The blue-light-proof optical resin lens according to claim 1, wherein the blue-light-proof optical resin lens also comprises a blue brightener with a mass ratio of 800-5,000 ppm.

4. A preparation method for the blue-light-proof optical resin lens according to claim 1, comprising: (1) preparing materials: weighing the resin monomers and the blue light absorber by ratio, mixing the weighed materials uniformly, heating the mixed materials, adding the polymerization initiator after the blue light absorber is completely dissolved, sealing the mixture at room temperature, uniformly stirring the mixture at vacuum, filtering the stirred mixture with a filter core, and then vacuuming; (2) immediately pouring, molding by thermocuring: pouring the materials prepared in step (1) into a closed mold, and thermocuring to mold the materials; (3) opening the mold, washing the obtained product; (4) annealing the product, and inspecting the obtained product.

5. The preparation method for the blue-light-proof optical resin lens according to claim 4, wherein the specific process of the material preparation in step (1) comprises steps: weighing the resin monomers and the blue light absorber by ratio, mixing the weighed materials uniformly, heating the mixed materials to 60° C., adding the polymerization initiator after the blue light absorber is completely dissolved, stirring the mixture for 2 h at room temperature and at a vacuum degree of −0.1 MPa, filtering the mixture with a 0.1 μm filter core, continuously stirring the mixture for 10 min, and then vacuuming for 40 min at a vacuum degree of −0.1 MPa.

6. The preparation method for the blue-light-proof optical resin lens according to claim 4, wherein in step (1) the polymerization initiator is added after the blue light absorber is completely dissolved, and followed by the blue brightener with a mass ratio of 800-5,000 ppm.

7. The preparation method for the blue-light-proof optical resin lens according to claim 4, wherein the thermocuring temperature curve and curing time in step (2) are as follows: heat up for 3 h such that the temperature rises from the range of 30-35° C. to the range of 80-95° C., keep the temperature in the range of 80-95° C. for 10 h, then continuously heat up for 7 h such that the temperature rises from the range of 85-95° C. to the range of 95-110° C., keep the temperature in the range of 95-110° C. for 1 h, continuously heat up for 1 h such that the temperature rises from the range of 95-110° C. to the range of 110-120° C., keep the temperature in the range of 110-120° C. for 1 h, and then cool down for 1 h such that the temperature reaches the range of 60-75° C.

8. The preparation method for the blue-light-proof optical resin lens according to claim 4, wherein in step (4), the annealing temperature is 120° C. and the curing time is 1 h.

9. The preparation method for the blue-light-proof optical resin lens according to claim 5, wherein in step (1) the polymerization initiator is added after the blue light absorber is completely dissolved, and followed by the blue brightener with a mass ratio of 800-5,000 ppm.

* * * * *